(12) United States Patent
Napier et al.

(10) Patent No.: US 6,516,925 B1
(45) Date of Patent: Feb. 11, 2003

(54) SYSTEM AND METHOD FOR BRAKING A TOWED CONVEYANCE

(75) Inventors: Steven Lee Napier, Canton, MI (US); Dale Scott Crombez, Livonia, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/672,441

(22) Filed: Sep. 28, 2000

(51) Int. Cl.$^7$ ................................................ B60T 7/20
(52) U.S. Cl. ............................ 188/112 A; 303/3; 303/7
(58) Field of Search .......................... 303/3, 7, 15, 17, 303/20, 29; 198/112 A, 112 R

(56) References Cited

U.S. PATENT DOCUMENTS

| | | |
|---|---|---|
| 3,953,084 A | 4/1976 | Pittet, Jr. et al. |
| 4,076,327 A * | 2/1978 | Hubbard ...................... 303/20 |
| 4,254,998 A | 3/1981 | Marshall et al. |
| 4,768,840 A | 9/1988 | Sullivan et al. |
| 4,984,852 A | 1/1991 | McNinch, Jr. |
| 5,001,639 A | 3/1991 | Breen |
| 5,039,173 A | 8/1991 | Emig et al. |
| 5,050,938 A | 9/1991 | Brearley et al. |
| 5,108,158 A | 4/1992 | Breen |
| 5,333,948 A | 8/1994 | Austin et al. |
| 5,352,028 A | 10/1994 | Eccleston |
| 5,559,420 A | 9/1996 | Kohchi |
| 5,615,930 A | 4/1997 | McGrath et al. |
| 5,782,542 A | 7/1998 | McGrath et al. |
| 5,954,164 A | 9/1999 | Latham |
| 6,039,410 A | 3/2000 | Robertson et al. |
| 6,079,792 A * | 6/2000 | Kessler .......................... 303/7 |

* cited by examiner

*Primary Examiner*—Pam Rodriguez
(74) *Attorney, Agent, or Firm*—Gregory P. Brown

(57) ABSTRACT

A system and method for braking a towed conveyance. In one embodiment, a system is provided for use on a trailer (102) having an axle assembly (108). The system (100) includes a motor controller (124), a pair of electric motor/generators (120), a battery (122), a battery controller (126), and sensors (128). Controller (124) monitors the yaw rate of trailer (102) by use of sensors (128). Based upon the monitored yaw rate, controller (124) selectively activates motor/generators (120) which provide a regenerative braking torque to axle assembly (108), thereby braking trailer (102) and generating electrical energy which may be used to recharge battery (122).

17 Claims, 7 Drawing Sheets

SYSTEM AND METHOD FOR BRAKING A TOWED CONVEYANCE

FIELD OF THE INVENTION

This invention relates to a system and method for braking a towed conveyance and more particularly, to a system and method for braking a towed conveyance such as an automotive vehicle or trailer which provides improved braking stability, efficiency and performance.

BACKGROUND OF THE INVENTION

Automotive vehicles are often used to tow or haul conveyances such as other automotive vehicles, trailers, motorcycles, boats, and other items. Vehicles and trailers that are towed by a car or truck often represent a relatively large towing load and can become unstable and/or cause situations that frustrate the driver or operator of the towing vehicle.

Particularly, on downgrades, the vehicle or trailer may tend to roll faster than the towing vehicle. In these types of situations, a trailer or vehicle may significantly encumber the braking system of the towing vehicle. For example and without limitation, the towed vehicle may undesirably and significantly lengthen braking distance and may cause significant and premature wear to the brakes of the towing vehicle. Moreover, the towed trailer or vehicle may further undesirably swing to one side or the other due to the geometry of the single point hitch.

Various efforts and systems have been implemented to correct the foregoing conditions. For example and without limitation, some experienced drivers learn to sense or anticipate these conditions and correct these conditions with the steering wheel and/or by adding stabilizing bars to prevent swinging of the towed trailer or vehicle. While such driver-performed maneuvers may be effective to reduce swinging under certain conditions, these maneuvers cannot significantly reduce braking distance or wear to the towing vehicle's braking system.

Other efforts include trailer brakes which may be installed on a trailer and which are particularly effective in straightening and stabilizing the path of the trailer. For example, a surge type braking system can be installed on a trailer which hydraulically or mechanically actuates trailer brakes in response to pressure on the tow "ball" or hitch. Other systems include electrically actuated braking systems which are installed on trailers. However, these systems and methods are adapted for use only with trailers and cannot be used with other automotive vehicles that may be desirably towed. Moreover, these systems and methods are energy inefficient and cause excessive wear to the trailer brakes.

There is therefore a need for a system and method for braking a towed conveyance which overcomes the drawbacks of prior systems, methods, and strategies.

SUMMARY OF THE INVENTION

It is a first object of the invention to provide a system and method for braking a towed conveyance which overcomes at least some of the previously delineated drawbacks of prior systems, methods and strategies.

It is a second object of the invention to provide a system and method for braking a towed vehicle which utilizes the towed vehicle's electrical braking, traction control and/or stability system(s) to improve braking stability, efficiency and characteristics.

It is a third object of the invention to provide a system and method for braking a towed conveyance, such as a trailer, which utilizes at least one electric motor/generator to selectively provide braking torque to the conveyance, thereby conserving energy and providing an auxiliary power source in the conveyance.

It is a fourth object of the invention to provide a system and method for braking a towed trailer which utilizes a yaw sensor to detect excessive trailer yaw rate and which activates an electric motor/generator in response to such a detection, effective to provide a braking torque to the trailer, thereby stabilizing the trailer.

According to a first aspect of the present invention, a method is provided for braking a first vehicle having a first braking system which is being towed by a second vehicle having a second electronic braking system. The method includes the steps of communicatively coupling said first braking system to said second braking system; and communicating a braking signal from said second braking system to said first braking system, said braking signal being effective to activate said first braking system and to cause said first braking system to provide a braking force to said first vehicle.

According to a second aspect of the present invention, a system is provided for braking a trailer which includes an axle assembly and which is being towed by a vehicle. The system includes at least one electric machine which is coupled to said axle assembly; a sensor which is effective to measure an attribute of said trailer and to generate a first signal representing said measured attribute; and a controller which is communicatively coupled to said at least one electric machine and said sensor, said controller being effective to receive said first signal and, based upon said first signal, to selectively communicate a second signal to said at least one electric machine, said second signal being effective to cause said at least one electric machine to apply a regenerative braking torque to said axle assembly, thereby braking said trailer and generating electrical energy.

These and other features, aspects, and advantages of the invention will become apparent by reading the following specification and by reference to the following drawings.

DETAILED DESCRIPTION OF THE PREFERRED EMBODIMENT OF THE INVENTION

Figure 1:
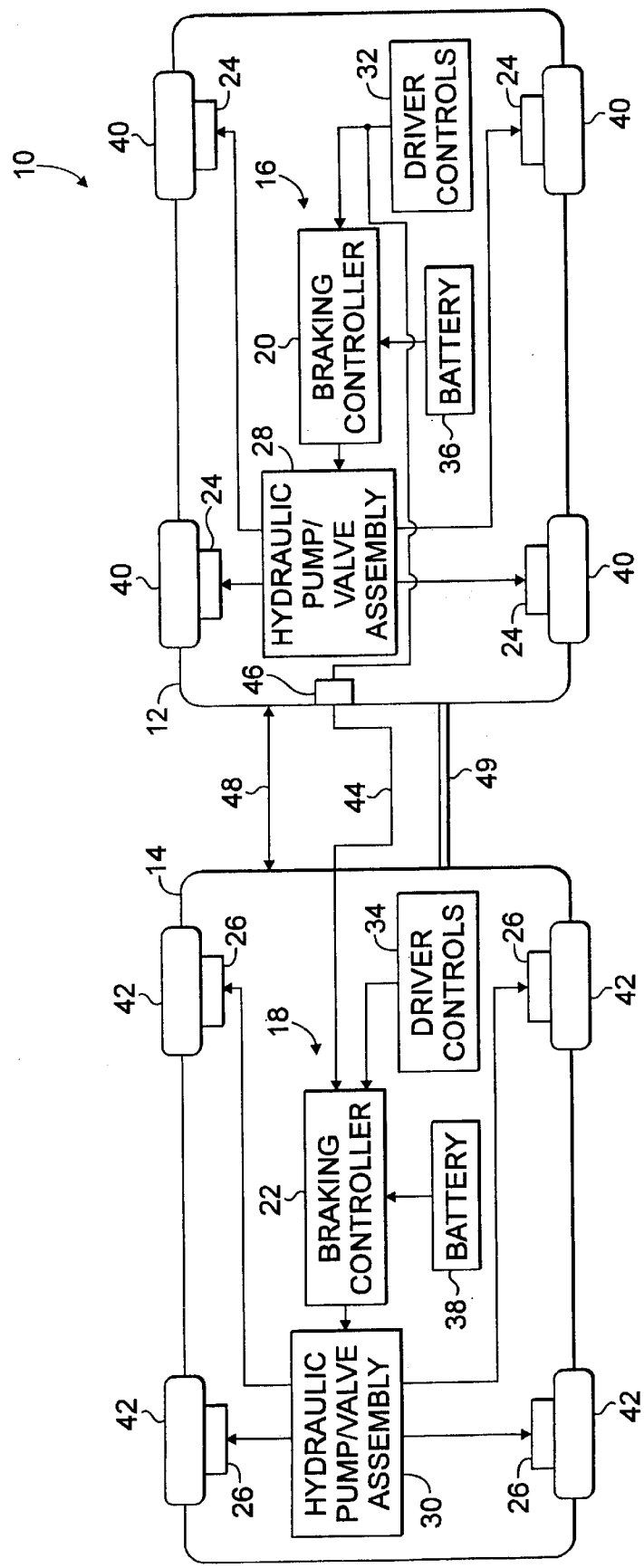
FIG. 1 is a block diagram illustrating a method for braking a towed vehicle which incorporates the teachings of a first embodiment of the present invention.

Referring now to FIG. 1, there is shown a method for braking a towed vehicle 14 which is performed in accordance with the teachings of a first embodiment of the present invention. Vehicle 14 is a conventional automotive vehicle which is being towed by a second conventional automotive vehicle 12. In the preferred embodiment, vehicles 12, 14 respectively include conventional electronic braking systems 16, 18. Braking systems 16, 18 each respectively includes a braking controller 20, 22, braking assemblies 24, 26, and hydraulic pump/valve assemblies 28, 30. Brakes 24, 26 are conventional friction type braking assemblies, such as a drum or disc type assemblies, which apply braking forces to wheels 40, 42. Brakes 24, 26 are operatively coupled to hydraulic pump/valve assemblies 28, 30, which selectively activate brakes 24, 26. Assemblies 28, 30 each include a source of pressurized fluid and several solenoid type valves which can be selectively energized and de-energized to control the individual brake assemblies 24, 26. It should be appreciated that while the present discussion relates to electronic/hydraulic braking systems, the present invention can be used with various other types of braking systems.

Controllers 20, 22 are respectively coupled to driver-operated controls 32, 34 (e.g. a brake pedal), hydraulic assemblies 28, 30, and sources of electrical power (e.g., a batteries) 36, 38. Controllers 20, 22 are conventional electronic braking controllers which respectively receive braking control signals from driver-operated controls 32, 34 and based upon the value or magnitude of the received braking control signals, controllers 20, 22 determine the amount of braking torque to be applied to each of wheels 40, 42. In alternate embodiments, controllers 20, 22 may be further coupled to conventional sensors, such as wheel speed and slip sensors which provide additional data that may be used to determine the amount of braking torque to be applied to wheels 40, 42 by braking assemblies 24, 26. Once controllers 20, 22 determine the amount of torque to be applied to wheels 40, 42, controllers 20, 22 cause voltage signals to be supplied to assemblies 28, 30, effective to activate the braking assemblies 24, 26 in a desired manner.

Importantly, in this non-limiting embodiment, controller 22 is further communicatively coupled to the driver controls 32 of vehicle 12 by use of an auxiliary bus 44 which may be selectively connected to a terminal 46 which is externally coupled to vehicle 12 and which is communicatively, physically and electrically coupled to driver controls 32. In an alternate embodiment, terminal 46 may be directly coupled to a controller 20, which transmits the driver-operated control signals to terminal 46. Vehicles 12, 14 are further communicatively coupled together by an electronic wire bundle or bus assembly 48 which communicates conventional left turn, right turn and stop lamp or "brake light" signals from vehicle 12 to vehicle 14. In one non-limiting embodiment, bus 44 comprises a portion of bus assembly 48.

Controller 22 selectively operates within a "tow mode" which is discussed more fully and completely below. In one non-limiting embodiment, controller 22 is set to "tow mode" by use of a user-operated electrical control or switch located within vehicle 14. In another embodiment, controller 22 is programmed to automatically enter into "tow mode" when vehicle 14 is not "running" (e.g., the engine is not running) and is in a "neutral" gear.

In operation, vehicle 14 is physically connected to vehicle 12 by use of a conventional trailer hitch or towing assembly 49. After the vehicles 12, 14 are physically coupled together, busses 44 and 48 are used to electrically and communicatively connect vehicle 14 to vehicle 12. Controller 22 is then set to "tow mode". While in "tow mode", controller 22 remains in a "sleep" or "at rest" state until it receives a braking control signal from bus 44. Upon receiving the braking control signal from bus 44, controller 22 is activated or "awakens". Controller 22 processes the received braking control signal in a conventional manner (i.e., in a manner substantially identical to the manner in which controller 22 processes signals from driver-operated controls 34) and determines a desired braking force based upon the control signal. Controller 22 then provides a voltage signal to hydraulic assembly 30 (e.g., controller 22 causes a certain amount of electrical power to be transferred from battery 38 to pump assembly 30) which activates braking assemblies 26 and slows the towed vehicle 14. In one non-limiting embodiment, the magnitude of the voltage signal provided to assembly 30 is a predetermined percentage of the magnitude of the voltage signal provided by controller 20 to hydraulic assembly 28.

In this manner, method 10 selectively activates the braking system 18 of towed vehicle 14 to supplement the braking provided by vehicle 12, thereby assisting vehicle 12 in braking vehicle 14. Method 10 utilizes existing hardware (i.e., braking system 18) to improve braking stability and efficiency. Moreover, method 10 significantly shortens the braking distance of vehicles 12, 14, and prevents premature wear to the brakes 24 of vehicle 12. In other alternate embodiments, the braking control signal transmitted over bus 44 can be communicated to other systems of vehicle 14 such as traction control and/or stability systems which can be used to control braking assemblies 26 and/or the speed of wheels 42 in a manner which desirably augments the braking force provided by the towing vehicle 12.

Figure 2:
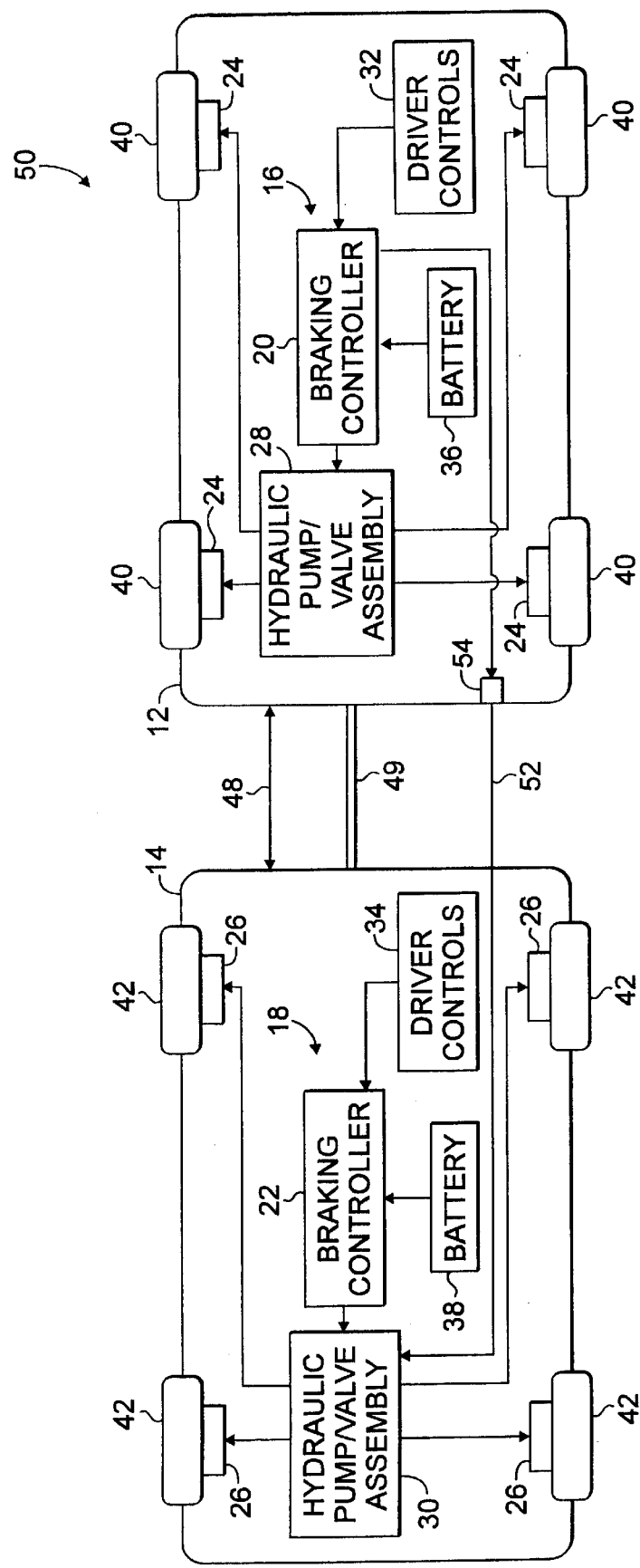
FIG. 2 is a block diagram illustrating a method for braking a towed vehicle which incorporates the teachings of a second embodiment of the present invention.

Referring now to FIG. 2, there is shown a method 50 which is performed according to a second embodiment of the present invention. Method 50 is substantially identical to method 10 with the following exceptions. Bus 44 and terminal 46 have been replaced with a high voltage electrical bus 52 and terminal 54. Bus 52 is directly connected to pump assembly 30 of vehicle 14 and terminal 54 is connected to braking controller 20 of vehicle 12. In this embodiment, controller 20 may be selectively set or programmed to a "towing mode" (e.g. by use of a conventional switch). While in "towing mode", controller 20 communicates an electrical power signal to pump assembly 30 of vehicle 14 in response to receipt of braking control signals from controls 32. Particularly, braking controller 20 directly transfers voltage from battery 36 to hydraulic assembly 30 of vehicle 14, effective to activate brakes 26. The magnitude of the power signal transferred to assembly 30 is determined by controller 20 and is proportional to the braking control signal received from controls 32. Because controller 22 is not active in the braking process, it can remain in an deactivated condition and does not have to be programmed to operate in the previously described "tow mode". In an alternate embodiment, the magnitude of the power signal communicated to vehicle 14 can be based upon a deceleration reading taken by a deceleration sensor located within controller 20 or 22.

Figure 3:
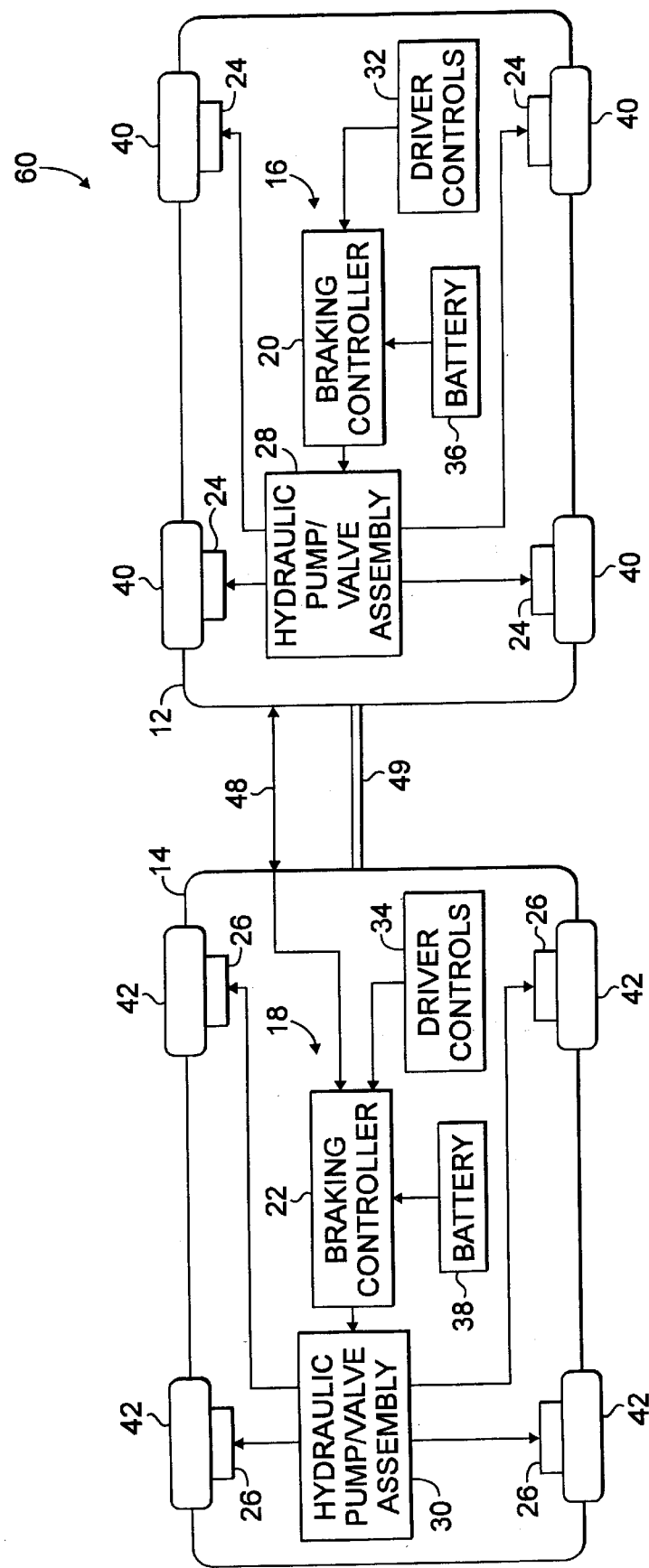
FIG. 3 is a block diagram illustrating a method for braking a towed vehicle which incorporates the teachings of a third embodiment of the present invention.

Referring now to FIG. 3, there is shown a method 60 for braking towed vehicle 14 which is performed according to a third embodiment of the present invention. Method 60 is substantially identical to method 10 with the exception that bus 44 and terminal 46 have been eliminated and braking controller 22 has been communicatively coupled to bus 48. Particularly, the "stop lamp" activation signal transmitted by bus 48 is directly communicated to controller 22. In this embodiment, controller 22 uses the existing "stop lamp" or "brake light" signal from vehicle 12 to activate and control the braking of vehicle 14. In this embodiment, controller 20 selectively operates within a "tow mode" which can be set by use of a user-operated electrical control or switch located within vehicle 14. In another embodiment, controller 22 is programmed to automatically enter into a "tow mode" when vehicle 14 is not running and is in a "neutral" gear, or by use of other sensed vehicle attributes or signals. When controller 22 is operating within "tow mode", it performs the braking strategy shown in FIG. 4.

Figure 4:
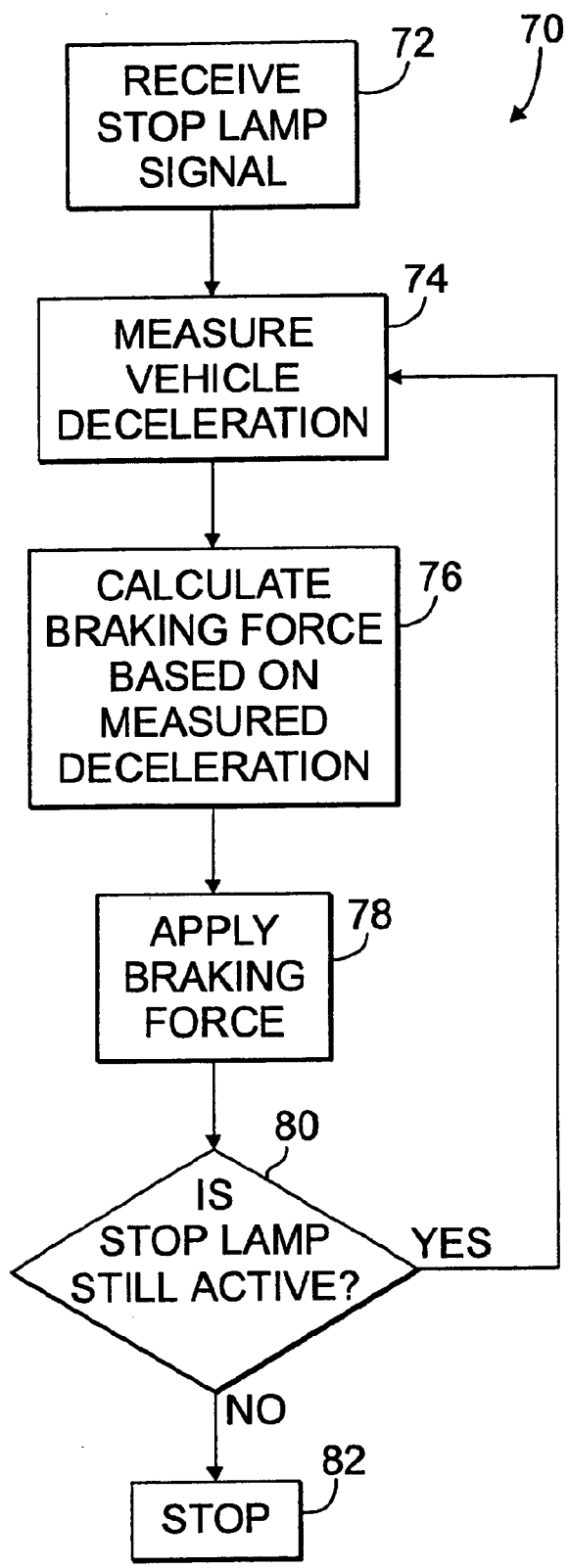
FIG. 4 is a block diagram of a control strategy used by the method shown in FIG. 3.

Braking strategy 70 of FIG. 4 begins with step 72, when controller 22 receives a stop lamp or brake light signal from bus 48. Upon receiving the signal from bus 48, controller 22 is activated or "wakes" and immediately measures and/or monitors the deceleration of vehicle 14 (e.g., by use of a conventional accelerometer), as shown in step 74. In step 76, controller 22 calculates or determines the brake force to be applied by brake assemblies 26 as a function of the measured deceleration. In one non-limiting embodiment, the magnitude of the calculated braking force is proportional to the measured deceleration. In step 78, controller 22 sends a voltage signal to assembly 30 which is effective to activate brakes 26 in the desired manner. Controller 22 continues to monitor the stop lamp signal to determine if it is still active, as shown in step 80. Controller 22 repeats steps 74–80 as long as the stop lamp signal is active. Once the stop lamp signal is deactivated, strategy 70 ends, as shown in step 82.

It should be appreciated that the architecture described in methods 10, 50 and 60 is for illustrative purposes only and that the foregoing methods 10, 50 and 60 may be used with different types of braking systems and arrangements. For example and without limitation, in one embodiment, the hydraulic braking system of vehicle 14 is replaced with an electromechanical braking system which can be selectively actuated in a substantially similar manner by use of a variety of braking signals that are communicated from vehicle 12 and/or braking system 16 (i.e., by use of a braking control signal, a voltage signal or a brake light signal). In another non-limiting embodiment, vehicle 14 includes electrically actuated parking brakes which can be selectively actuated in a substantially similar manner by use of a variety of braking signals that are communicated from vehicle 12. Moreover, the methods 10, 50 and 60 may consider various other parameters (e.g., the speed, acceleration and yaw rate of the respective vehicles) when determining the data and/or power signals which are transferred from braking system 16 to braking system 18 and how the braking system 18 reacts to and/or utilizes the transferred signals to brake vehicle 14.

Figure 5:
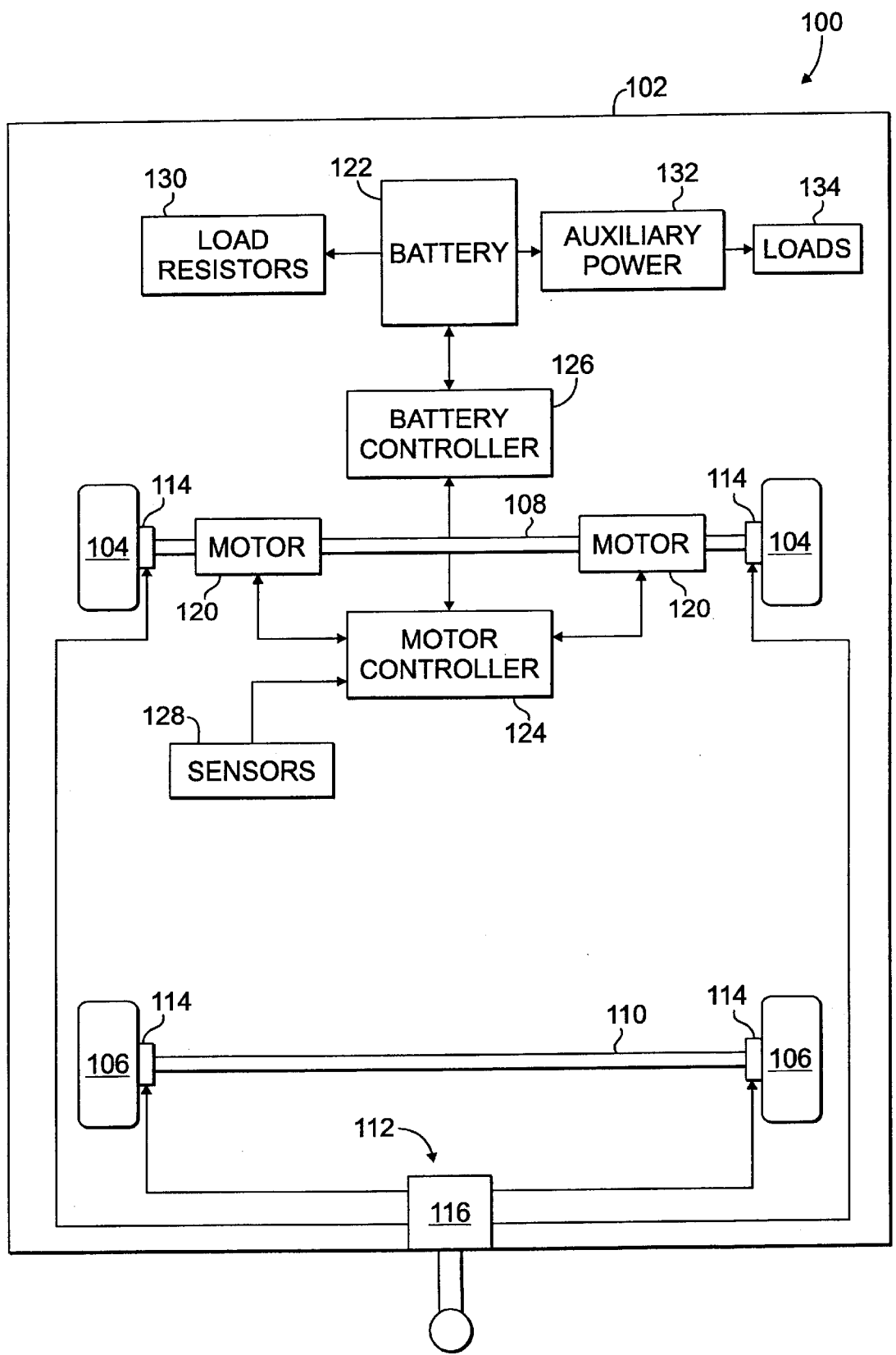
FIG. 5 is a block diagram of a system for braking a towed trailer which is made in accordance with the teachings of an alternate embodiment of the present invention.

Referring now to FIG. 5, there is shown a system 100 for braking a towed trailer 102 which is made in accordance with the teachings of an alternate embodiment of the present invention. Trailer 102 includes a friction braking system 112, and several wheels 104, 106 which are operatively and rotably coupled to axle assemblies 108, 110. Friction braking system 112 is a conventional mechanically, electrically and/or hydraulically actuated friction braking system including several drum or disk type friction braking members 114 and an actuating assembly 116, which may comprise a pressure responsive actuator (e.g., in the case of a mechanical or hydraulic system) or a controller or other electrical braking signal source (e.g., in the case of an electrical system). While the following discussion describes system 100 as implemented on trailer 102, it should be appreciated that system 100 may be adapted for use on various other types of trailers, vehicles and conveyances.

System 100 includes a motor controller 124, a pair of electric machines or motor/generators 120, a conventional electrical energy storage device or battery 122, a battery controller 126, and sensors 128. Controller 124 is communicatively coupled to sensors 128, to motor/generators 120, and to battery controller 126. Battery 122 is communicatively coupled to battery controller 126.

Controller 124 receives signals and/or commands generated by sensors 128, and processes and utilizes the received signals to determine the amount of braking torque which is to be provided to the wheels 104 by motor/generators 120, and causes motor/generators 120 to cooperatively provide the desired torque to the wheels 104.

In the preferred embodiment of the invention, electric machines 120 are conventional electric motor-generator units. Electric motor/generators 120 are operatively coupled to the axle assembly 108 in a known and conventional manner. Motor/generators 120 selectively provide braking torque to the axle assembly 108 of trailer 102, thereby braking trailer 102 and providing regenerative electrical power to battery 122. Particularly, motor/generators 120 perform a "regenerative" type braking function by selectively applying a negative torque to axle assembly 108, thereby converting the kinetic energy of trailer 102 into electrical energy which is communicated to battery 122 through motor controller 124 and battery controller 126 and which is used to recharge battery 122 and to electrically power auxiliary power source 132 and electrical loads 134 (e.g., battery 122 supplies power to auxiliary power source 132 which operates conventional electrical loads and accessories 134 within trailer 102). In an alternate embodiment, motor/generators 120 are replaced with a single motor generator unit.

In the preferred embodiment, motor controller 124 and battery controller 126 each include one or more microprocessors or controllers as well as other chips and integrated circuits which cooperatively control the operation of system 100. In the preferred embodiment, controller 124 comprises a conventional motor controller which controls the operation of motors 120, and controller 126 comprises a conventional battery controller which controls the operation of battery 122. Controllers 124, 126 may each comprise a separate controller or may be embodied within a single controller, chip, microprocessor or device. Controller 124 is effective to determine the total amount of braking torque which is to be provided or delivered to axle assembly 108 and/or wheels 104 and to partition or divide the total torque between each motor 120 (e.g., based on yaw rate values). Controller 126 is effective to monitor and/or estimate the state of charge of battery 122 and to selectively discharge battery 122 by use of conventional load resistors 130 if the state of charge of battery 122 exceeds a certain predetermined value.

In one alternate embodiment, system 100 includes a system controller which is communicatively coupled to controllers 124, 126 and sensors 128. In this alternate embodiment, the system controller handles input and output functions, calculates necessary parameters and desired retarding forces and issues torque commands. The system controller may also control start up and shut down sequences, issue warning messages, and store diagnostic data.

Sensors 128 comprise one or more conventional and commercially available sensors which measure and/or acquire information pertaining to attributes of trailer 102. In the preferred embodiment of the invention, sensors 128 include a conventional yaw rate sensor adapted to estimate and/or determine the lateral acceleration of trailer 102, and one or more brake sensors which are adapted to sense the braking of trailer 102. Sensors 128 generate one or more signals to controller 124 based upon these measured and/or estimated values. In one alternate embodiment, sensors 128 include individual wheel speed sensors which are used to calculate yaw rate through a conventional algorithm.

In operation, the conventional remotely operated friction brake system 112 is augmented by use of motor/generators 120 that selectively provide a electrically controlled, regenerative braking force. The control for the braking force is derived by controller 124 from measured vehicle parameters (e.g., yaw rate) without requiring driver intervention.

Particularly, excessive trailer yaw rate is detected by yaw rate sensor 128, and/or by interaction with other vehicle systems or by calculations from other system sensors (e.g., wheel speed sensors). The controller 124 calculates the appropriate retarding force in excess of the retarding force provided by the friction brakes, if any. Controller 124 then issues a command to motors 120 to provide the appropriate retarding force with the resulting electrical energy being stored by the battery 122. As the measured yaw rate is brought within a predetermined target range, the retarding force provided by motors 120 is gradually removed. It should be appreciated that motor/generators 120 can be used in any braking situation even in the absence of excessive yaw rate. In one non-limiting embodiment, the use of motor/generators 120 is prolonged to provide maximum regenerative capability.

Several maintenance functions are performed constantly along with the foregoing strategy. For example and without limitation, the battery controller 126 constantly monitors the state of charge of battery 122. If the state of charge exceeds a predetermined value, the charge can be lowered by use of "bleed" or load resistors 130. If the state of charge falls below a certain predetermined value, a low level of charging is performed by symmetric generation at a relatively low level. Additionally, the controller 124 constantly checks for over current, under voltage, signals that are out of range, and logic checks on reasonable outputs. For example and without limitation, in one non-limiting embodiment, controller 124 determines whether retarding for stability is longer than a predetermined limit, whether retarding has exceeded a predetermined limit, whether the state of charge is out of a predetermined range, whether the direction of retarding does not match direction of yaw, and whether rate of change of retarding does not match rate of change of yaw.

Figure 6:
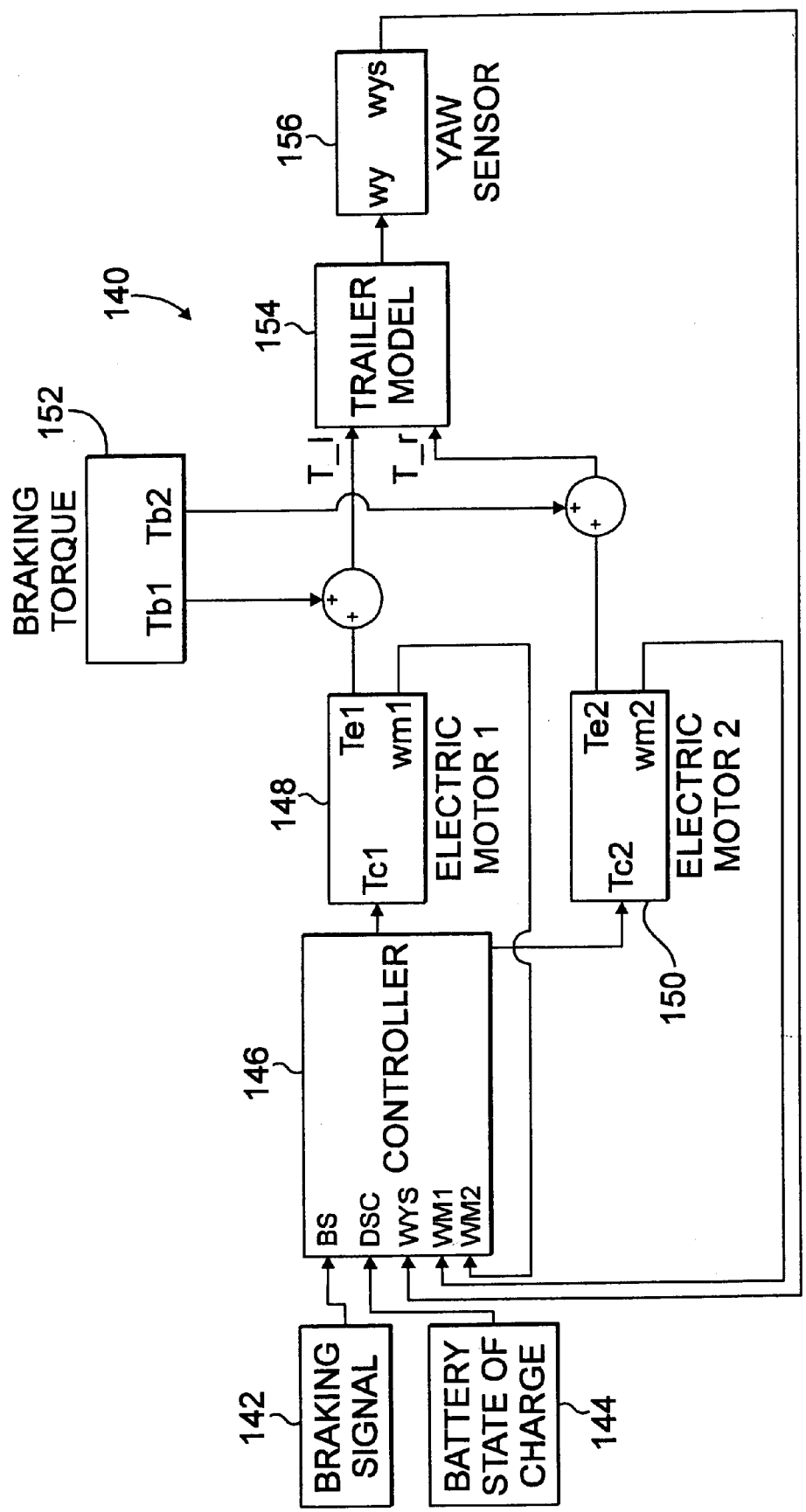
FIG. 6 is a block diagram illustrating one non-limiting example of a control strategy implemented by the system shown in FIG. 5.

Control strategies for system 100 can be approached in several ways depending on the physical and functional implementation of the system. FIG. 6 illustrates a schematic diagram 140 of a control strategy which can be implemented with system 100 and which assumes no direct communication with the towing vehicle other than the conventional communication that is required to operate trailer brakes and stop lights. This configuration has the advantage that it is compatible with any towing vehicle and can be sold completely independently or as an add-on to existing trailers.

In control system 140, block 142 represents the braking signal, block 144 represents the state of charge of battery 122, block 146 represents controller 124, blocks 148, 150 represent motors 120, block 152 represents the braking torque provided by friction braking members 114, block 154 represents the trailer 102, and block 156 represents the yaw sensor 128. The speed of electric motors 148, 150 (i.e., wm1 and wm2) is measured and is used in the control loop to generate required torque commands (Tc1 and Tc2) and/or to estimate the yaw rate. The braking signal (BS) and battery state of charge signal (BSC) are also used in the control logic. As shown, the torque provided by the electric motors (i.e., Te1 and Te2) are added to the torque provided by braking members 152 (i.e., Tb1 and Tb2) to comprise the total left and right braking force (T_l and T_r) that is provided to trailer model 154 (e.g., to each of wheels 104).

Figure 7:
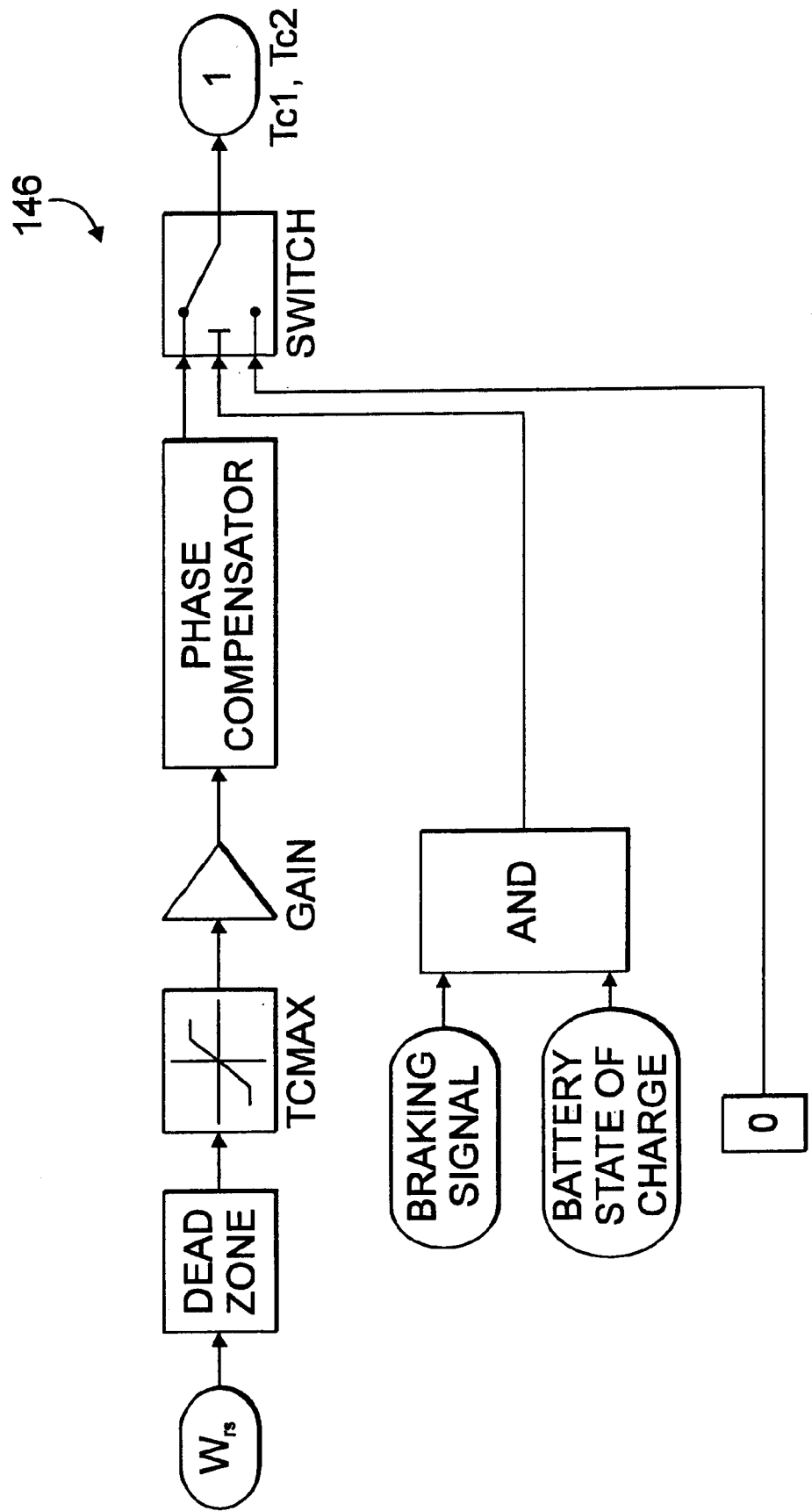
FIG. 7 is a block diagram illustrating one non-limiting model of the controller used within the system shown in FIG. 5.

A representation of one embodiment of control block 146 is illustrated in FIG. 7. Control block 146 implements the following feedback control:

$$T_c = -K_P \frac{T_1 s + 1}{\alpha T_1 s + 1} \frac{T_2 s + 1}{\alpha T_2 s + 1} \omega_{rs} \qquad \text{(Eq. 1)}$$

where $K_P$ is the controller gain, $\omega_{rs}$ is the yaw rate, and $T_1, T_2, \alpha$ are parameters of the phase lead compensator. The one/two link lead compensator is required to achieve the control design with good stability margin and response. The controller model shown in FIG. 7 also includes the dead zone block to make the system more robust to measurement noise, and a saturation block (i.e., Tcmax) to limit the undesirable transients from the torque command which could affect the system performance. In the considered control structure, the yaw control is active only when the brake signal is activated. Other applicable control schemes for use with the present invention could include but not be limited to: classic controllers with deterministic control laws, fuzzy logic, and neural networks.

A single motor architecture is inherently stable since any decelerating torque will tend to straighten the path of the vehicle and the trailer. In one non-limiting embodiment, each major component in system 100 (e.g. controller, electric machine) may also be subject to internal diagnostics and fault checks.

In one non-limiting embodiment, torque is selectively generated in a reverse or positive direction by the electric machines 120 when trailer 102 is at parking speeds. In this embodiment, torque is selectively applied through a one way (e.g., planetary) gear reduction such that the trailer can pull itself (and possibly the towing vehicle) backward into a parking location. In this way maneuvering the trailer can be performed quickly and accurately by a relatively inexperienced operator, and with or without the aid of the towing vehicle. Maneuvering without the towing vehicle requires only a fraction of the room required while the towing vehicle is attached.

The towing system 100 overcomes the drawbacks associated with prior systems while conserving energy, and stabilizing the trailer's path regardless of operator skill. System 100 provides the additional benefits of an auxiliary power source in the trailer; a source for jump-starting the engine of the tow vehicle; and a reduction of wear on trailer's friction brakes. Instead of being lost as friction heat, the kinetic energy of the trailer is regenerated and stored in the system battery. No separate power source is required to run the system since it will store energy that can be used in its operation.

It should be understood that Applicants' invention is not limited to the exact structures, systems and methods which have been described herein, but that various changes and/or modifications may be made without departing from the spirit and/or the scope of Applicants' invention.

What is claimed is:

1. A method for towing a first automobile by the use of a second automobile wherein said first and said second automobiles each being of the type having a braking system and a controller which is coupled to said braking system, said method comprising:

generating a brake request signal in said second automobile;

communicating said generated brake request signal to said controller which is resident within said second automobile;

causing said controller within said second automobile to activate said braking system of said second automobile upon receipt of said brake request signal, thereby braking said second automobile by a certain first amount;

causing said controller of said second automobile to generate a brake request signal to said controller of said first automobile;

causing said controller of said first automobile to activate said braking system of said first automobile upon receipt of said brake request signal emanating from said controller of said second automobile, thereby braking said first automobile by a certain second amount which is less than said first amount, thereby causing said braking system of said first automobile to augment said braking system of said second automobile by supplementing the amount of braking provided by said braking system of said first automobile.

2. The method of claim 1 further comprising the step of causing said first automobile to begin braking shortly after said second automobile has begun braking.

3. The method of claim 2 wherein said controller of said second automobile activates said braking system by applying a certain magnitude of voltage to said braking system in response to a certain depression of a brake pedal resident within said second automobile and wherein said step of braking said first automobile by a certain second amount which is less than said first amount further comprises the steps of:

activating said braking system of said second automobile by applying said certain magnitude of voltage from said controller of said second automobile to said braking system in response to said certain depression of said brake pedal;

calculating a predetermined percentage of said certain magnitude of voltage; and communicating said calculated percentage of said certain magnitude of voltage to said controller of said first automobile, thereby allowing the braking force which was applied to said first automobile to supplement the braking force which was applied to said second automobile.

4. A method for towing a first automobile by the use of a second automobile wherein said first and said second automobiles each being of the type having at least one driver operated assembly and a controller which is coupled to said at least one driver operated assembly, said method comprising:

generating a driver operated control signal in said second automobile;

communicating said generated driver operated control signal to said controller which is resident within said first automobile;

causing said controller within said second automobile to activate said at least one driver operated assembly within said second automobile upon receipt of said driver operated control signal;

causing said controller of said second automobile to generate a driver operated control request signal to said controller of said first automobile; and causing said controller of said first automobile to activate said at least one driver operated assembly of said first automobile upon receipt of said driver operated control request signal emanating from said controller of said second automobile.

5. The method of claim 4 further comprising the step of causing said first automobile to activate said at least one driver operated assembly shortly after said second automobile has activated said at least one driver operated assembly.

6. The method of claim 5 wherein said at least one driver operated assembly of said first and said second automobiles comprises a left hand turn indicator.

7. The method of claim 6 wherein said left hand turn indicator of said first and said second automobiles further comprises a blinking left hand turn signal light.

8. The method of claim 5 wherein said at least one driver operated assembly of said first and said second automobiles comprises a right hand turn indicator.

9. The method of claim 8 wherein said right hand turn indicator of said first and said second automobiles further comprises a blinking right hand turn signal light.

10. A method for towing a first automobile by the use of a second automobile wherein said first and said second automobiles each being of the type having a braking system, at least one driver operated assembly, and a controller which is coupled to said braking system and said at least one driver operated assembly, said method comprising:

generating a brake request signal in said second automobile;

generating a driver operated control signal in said second automobile;

communicating said generated brake request signal to said controller which is resident within said second automobile;

communicating said generated driver operated control signal to said controller which is resident within said second automobile;

causing said controller within said second automobile to activate said braking system of said second automobile upon receipt of said brake request signal, thereby braking said second automobile by a certain first amount;

causing said controller within said second automobile to activate said at least one driver operated assembly of said second automobile upon receipt of said driver operated control signal;

causing said controller of said second automobile to generate a brake request signal to said controller of said first automobile;

causing said controller of said second automobile to generate a driver operated control request signal to said controller of said first automobile;

causing said controller of said first automobile to activate said braking system of said first automobile upon receipt of said brake request signal emanating from said controller of said second automobile, thereby braking said first automobile by a certain second amount which is less than said first amount, thereby causing said braking system of said second automobile to augment said braking system of said first automobile by supplementing the amount of braking provided by said braking system of said first automobile; and causing said controller of said first automobile to activate said at least one driver operated assembly of said first automobile upon receipt of said driver operated control request signal emanating from said controller of said second automobile.

11. The method of claim 10 further comprising the step of causing said first automobile to activate said at least one driver operated assembly shortly after said second automobile has activated said at least one driver operated assembly.

12. The method of claim 11 further comprising the step of causing said first automobile to begin braking shortly after said second automobile has begun braking.

13. The method of claim 10 wherein said controller of said second automobile activates said braking system by applying a certain magnitude of voltage to said braking system in response to a certain depression of a brake pedal resident within said second automobile and wherein said step of braking said first automobile by a certain second amount which is less than said first amount further comprises the steps of:

activating said braking system of said second automobile by applying said certain magnitude of voltage from said controller of said second automobile to said braking system in response to said certain depression strength of said brake pedal;

calculating a predetermined percentage of said certain magnitude of voltage; and communicating said calculated percentage of said certain magnitude of voltage to said controller of said first automobile, effective to cause said controller of said first automobile to activate said braking system of said first automobile, thereby allowing the braking force which was applied to said first automobile to supplement the braking force which was applied to said second automobile.

14. The method of claim 10 wherein said at least one driver operated assembly of said first and said second automobiles comprises a left hand turn indicator.

15. The method of claim 14 wherein said left hand turn indicator of said first and said second automobiles further comprises a blinking left hand turn signal light.

16. The method of claim 10 wherein said at least one driver operated assembly of said first and said second automobiles comprises a right hand turn indicator.

17. The method of claim 16 wherein said right hand turn indicator of said first and said second automobiles further comprises a blinking right hand turn signal light.

* * * * *